(12) United States Patent
Beck

(10) Patent No.: US 11,258,348 B2
(45) Date of Patent: Feb. 22, 2022

(54) EMC FILTER AND USE THEREOF

(71) Applicant: EPCOS AG, Munich (DE)

(72) Inventor: Fabian Beck, Rüttenen (CH)

(73) Assignee: EPCOS AG, Munich (DE)

( * ) Notice: Subject to any disclaimer, the term of this patent is extended or adjusted under 35 U.S.C. 154(b) by 180 days.

(21) Appl. No.: 16/079,326

(22) PCT Filed: Feb. 21, 2017

(86) PCT No.: PCT/EP2017/053902
§ 371 (c)(1),
(2) Date: Aug. 23, 2018

(87) PCT Pub. No.: WO2017/144447
PCT Pub. Date: Aug. 31, 2017

(65) Prior Publication Data
US 2020/0136497 A1 Apr. 30, 2020

(30) Foreign Application Priority Data
Feb. 26, 2016 (DE) .......................... 102016103447.9

(51) Int. Cl.
*H02M 1/12* (2006.01)
*H02J 3/01* (2006.01)
*H02J 50/12* (2016.01)
*H02M 1/44* (2007.01)

(52) U.S. Cl.
CPC ............... *H02M 1/126* (2013.01); *H02J 3/01* (2013.01); *H02J 50/12* (2016.02); *H02M 1/44* (2013.01)

(58) Field of Classification Search
CPC .......... H02M 1/126; H02M 1/44; H02J 50/12; H02J 3/01
USPC .......................................... 307/104; 320/108
See application file for complete search history.

(56) References Cited

U.S. PATENT DOCUMENTS

| | | |
|---|---|---|
| 5,619,080 A | 4/1997 | Pennington et al. |
| 7,362,162 B2 | 4/2008 | Paulwitz et al. |
| 7,742,318 B2 | 6/2010 | Fu et al. |
| 2011/0009057 A1 | 1/2011 | Saunamaki |
| 2012/0003807 A1 | 1/2012 | Furuno et al. |
| 2013/0062964 A1* | 3/2013 | Chernokalov .......... H02J 50/12 307/104 |
| 2013/0119773 A1* | 5/2013 | Davis ...................... H02J 50/70 307/104 |
| 2014/0266507 A1* | 9/2014 | Fauer ................... H03H 1/0007 333/181 |
| 2015/0008751 A1* | 1/2015 | Widmer .................. H02J 50/10 307/104 |

(Continued)

FOREIGN PATENT DOCUMENTS

| | | |
|---|---|---|
| CN | 101272086 A | 9/2008 |
| CN | 101707474 A | 5/2010 |

(Continued)

*Primary Examiner* — Hal Kaplan
*Assistant Examiner* — Thai H Tran
(74) *Attorney, Agent, or Firm* — Slater Matsil, LLP

(57) ABSTRACT

A filter component such as an EMC filter and a method for using an filter component are disclosed. In an embodiment, a filter component includes a resonant circuit having an inductance and at least one capacitor that is connected in series with the inductance, wherein the resonant circuit is designed and arranged for attenuating harmonics in a long-wave band.

12 Claims, 3 Drawing Sheets

(56) References Cited

U.S. PATENT DOCUMENTS

| | | |
|---|---|---|
| 2015/0194811 A1 | 7/2015 | Mao |
| 2015/0236518 A1 | 8/2015 | Matsumoto et al. |
| 2016/0028241 A1* | 1/2016 | Ichikawa .............. B60L 53/122 |
| | | 307/9.1 |
| 2016/0056640 A1 | 2/2016 | Mao |
| 2016/0094082 A1 | 3/2016 | Ookawa et al. |
| 2016/0135300 A1 | 5/2016 | Inagaki |

FOREIGN PATENT DOCUMENTS

| | | |
|---|---|---|
| CN | 202384990 U | 8/2012 |
| CN | 105099165 A | 11/2015 |
| CN | 105308819 A | 2/2016 |
| JP | 2001024462 A | 1/2001 |
| JP | 2007067941 A | 3/2007 |
| JP | 2008245037 A | 10/2008 |
| JP | 2014166063 A | 9/2014 |
| JP | 2014222707 A | 11/2014 |
| JP | 2015012169 A | 1/2015 |
| JP | WO2013005375 A1 | 2/2015 |
| JP | 2015165506 A | 9/2015 |
| JP | 2015173587 A | 10/2015 |
| JP | 2016025771 A | 2/2016 |
| WO | 0207293 A1 | 1/2002 |
| WO | 2015177657 A1 | 11/2015 |

\* cited by examiner

FIG 3 -Prior Art-

EMC FILTER AND USE THEREOF

This patent application is a national phase filing under section 371 of PCT/EP2017/053902, filed Feb. 21, 2017, which claims the priority of German patent application 10 2016 103 447.9, filed Feb. 26, 2016, each of which is incorporated herein by reference in its entirety.

TECHNICAL FIELD

The present invention relates to a filter component, particularly an EMC filter. The invention further relates to the use of a filter component.

BACKGROUND

In wireless power transmission (WPT), electric power is transmitted contactlessly from one object to another. The frequency of the wireless power transmission is typically between 81 kHz and 90 kHz, particularly is approximately 85 kHz, for applications in the automotive sector. Following wireless power transmission, the alternating signal needs to be rectified and subsequently forwarded to the high voltage (HV) bus. The signal on the HV bus then needs to be in the limited harmonic range from the 85 kHz rectification or conditioning and be as free of interference as possible.

Standard EMC filter components neglect sufficient filtering in the longwave (LW) band. Filters based on typical LC sections have excessively large dimensions, in particular, and require too many electrical components.

SUMMARY OF THE INVENTION

Embodiments provide a filter component that has improved properties.

According to one aspect, a filter component for use in wireless power transmission is specified. In particular, the filter component is used for the signal filtering in wireless power transmission in the automotive sector.

The filter component has a resonant circuit. The resonant circuit has an inductance. The resonant circuit has at least one capacitor. The capacitor is connected in series with the inductance. The resonant circuit is a series resonant circuit. The resonant circuit is designed and arranged for attenuation of harmonics in the longwave band.

The inductance of the resonant circuit can have one element or multiple elements. The multiple elements may be connected in parallel or in series. The capacitor or the capacitor arrangement of the resonant circuit can have one element or multiple elements. The multiple elements may be connected in parallel or in series.

The filter component can further have one or more filter structures L, C, LC, CLC, LCLC, etc. The filter component can have arbitrary combinations of the filter structures. By way of example, the filter component can have one or more LC stages, for example, a first LC filter stage and a second LC filter stage.

On the basis of the rectification of the signal supplied to the filter component, it is possible to see a multiple of a fundamental frequency of, by way of example, 85 kHz in the noise spectrum. A standard EMC filter component that allows an attenuation of approximately 30 to 40 dB to be achieved does not allow the second harmonic at 170 kHz, which is in the longwave radio band, to be sufficiently attenuated by a small number of electrical variables/components.

The filter component described specifies a compact and simple component that effectively rejects the second harmonic. In particular, the harmonic is shorted in a simple manner by the resonant circuit. A large number of capacitors, for example, for a first and a second LC filter stage and a large inductance of the first and second LC filter stages can be avoided. This allows a low-noise signal to be made available using a simple component having small dimensions.

According to one exemplary embodiment, the filter component has a first LC filter stage. The filter component, particularly the first LC filter stage, has one or a multiplicity of first capacitors. The filter component can have a second LC filter stage. The filter component, particularly the second LC filter stage, has one or a multiplicity of second capacitors.

According to one exemplary embodiment, a fundamental frequency of the wireless power transmission is between 81 kHz and 90 kHz. Preferably, the fundamental frequency is 85 kHz. The resonant circuit is designed and arranged for attenuation of the second harmonic. In particular, the resonant circuit is designed and set up for attenuation of a frequency of 170 kHz. Preferably, the resonant frequency of the resonant circuit is 170 kHz. In this way, the second harmonic can be effectively attenuated in a simple manner.

According to one exemplary embodiment, the resonant circuit is connected downstream of the LC filter stages.

According to one exemplary embodiment, an equivalent resistance of the resonant circuit is less than or equal to the impedance of the at least one second capacitor. In particular, the resonant circuit has only a small number of capacitors. In this way, the impedance at 170 kHz can be reduced.

According to one exemplary embodiment, the resonant circuit has a quality factor Q. Preferably, Q is $\leq 100$, particularly preferably, Q is $\leq 50$. The low quality factor means that a bandwidth from 162 kHz to 180 kHz can be covered. The second harmonic can be effectively rejected.

According to one exemplary embodiment, the inductance is designed such that the resonant frequency is 170 kHz. This allows the sub-harmonic to be effectively rejected at a fundamental frequency of approximately 85 kHz.

According to one exemplary embodiment, the value of the capacitors of the resonant circuit corresponds to the value of the second capacitors. This ensures that there is sufficient filter action beyond the second harmonic too.

According to a further aspect, the use of a resonant circuit at a frequency of 170 kHz with a quality factor Q is described, wherein $Q \leq 100$. Preferably, the resonant circuit has an inductance and at least one capacitor. The resonant circuit can have a plurality of capacitors. The at least one capacitor is connected in series with the inductance. Preferably, the resonant circuit corresponds to the resonant circuit described above. All properties that have been described in connection with the resonant circuit also apply to the use of the resonant circuit, and vice versa.

Preferably, the resonant circuit is used in wireless power transmission. In particular, the resonant circuit is used for the signal filtering in wireless power transmission in the automotive sector. Preferably, the resonant circuit is used in an EMC filter component, particularly the filter component described above. In particular, the resonant circuit is used for filtering the 2nd harmonic at a fundamental frequency of 85 kHz.

BRIEF DESCRIPTION OF THE DRAWINGS

The drawings described below are not intended to be understood as being to scale. Rather, individual dimensions may be depicted in enlarged, reduced or even distorted form for the purpose of better representation.

Elements that are identical to one another or that perform an identical function are denoted by the same reference symbols.

In the drawings:

FIG. 1 shows a circuit diagram of a filter component for filtering an interference voltage based on the prior art;

FIG. 2 shows a circuit diagram of a filter component for filtering an interference voltage;

FIG. 3 shows a graph of a voltage signal that has been filtered using a filter component based on the prior art; and FIG. 4 shows a graph of a voltage signal that has been filtered using a filter component according to the invention.

DETAILED DESCRIPTION OF ILLUSTRATIVE EMBODIMENTS

Figure 1:
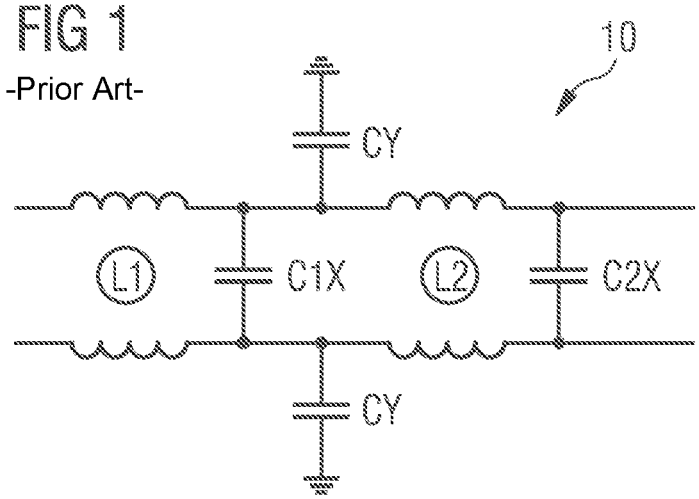

FIG. 1 shows a circuit diagram for a filter component 10 based on the prior art. The filter component 10 is an EMC filter.

The filter component 10 has a first LC filter stage L1C1X. The first LC filter stage L1C1X has a first inductance L1 and a first capacitor arrangement C1X. The capacitor arrangement C1X has at least one capacitor C1, but preferably a multiplicity X of capacitors C1.

The filter component 10 further has a second LC filter stage L2C2X. The second LC filter stage L2C2X is connected in series with the first LC filter stage L1C1X. The second LC filter stage L2C2X has a second inductance L2 and a second capacitor arrangement C2X. The capacitor arrangement C2X has at least one capacitor C2, but preferably a multiplicity X of capacitors C2.

Instead of the first and second LC filter stages, the filter component 20 can alternatively have a filter structure or an arbitrary number of filter structures L, C, LC, CLC, LCLC (not depicted explicitly). The filter structures may be combined arbitrarily, in particular.

Further, the filter component 10 also has capacitors CY that also help to sufficiently reject interference with respect to the ground together with the first inductance L1 and the second inductance L2.

In the arrangement shown in FIG. 1, the rectified signal reaches the filter 10 before it is forwarded to the HV bus. On the basis of the rectification, it is possible to see a multiple of the fundamental frequency of 85 kHz in the noise spectrum. The filter component 10 based on the prior art that is shown merely allows an attenuation of approximately 20 dB to be obtained, which is not sufficient to effectively reject the second harmonic (2·85 kHz=170 kHz).

Figure 2:
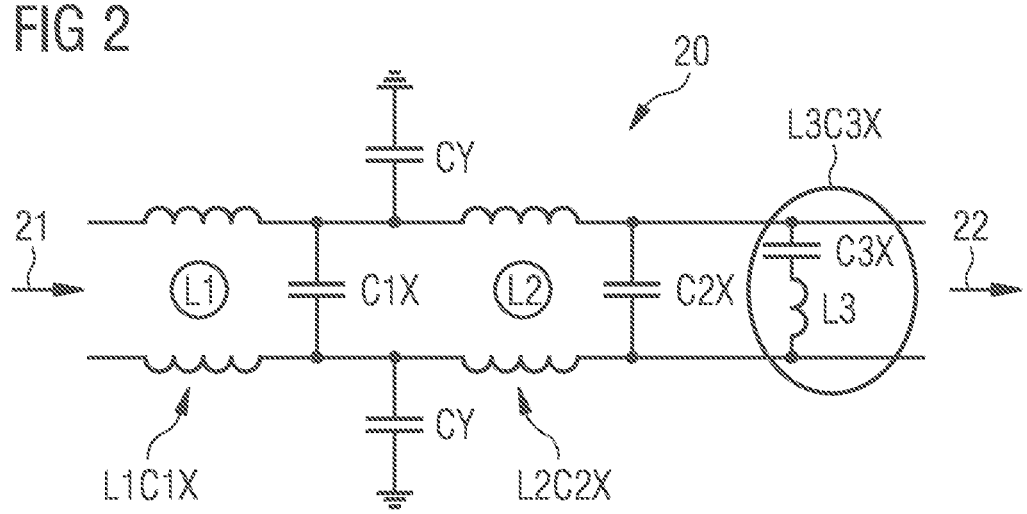

FIG. 2 shows a circuit diagram for a filter component 20 according to the invention. The filter component 20 is an EMC filter.

The text below demonstrates only the differences in comparison with the filter component 10 described above. In particular, the filter component 20 has a resonant circuit L3C3X besides the first LC filter stage L1C1X and the second LC filter stage L2C2X.

The resonant circuit L3C3X is connected in parallel with the first LC filter stage L1C1X and the second LC filter stage L2C2X. The resonant circuit L3C3X has an inductance L3. The resonant circuit L3C3X has a capacitor arrangement C3X. The capacitor arrangement C3X has at least one capacitor C3. It goes without saying that the capacitor arrangement C3X can also have a multiplicity X of capacitors C3, for example, two, three, five or ten capacitors, however. The inductance L3 and the capacitor arrangement C3X are connected in series. The resonant circuit L3C3X is a series resonant circuit. The resonant circuit has a resonant frequency of 170 kHz.

To set the resonant frequency of 170 kHz, the number and properties of the capacitor arrangements C2X and C3X provided in the filter component 20 are preferably chosen such that C2X=C3X. Further, L3 is chosen such that the resonant frequency is 170 kHz.

The resonant circuit L3C3X has a quality factor Q. The quality factor Q is a measure of the attenuation that is achieved by the resonant circuit L3C3X. The lower the quality factor Q, the higher the attenuation, and vice versa. The resonant circuit L3C3X has a low quality factor. The quality factor Q needs to be low in order to cover a bandwidth from 162 kHz to 180 kHz. In particular, it holds that Q≤100.

The resonant circuit L3C3X is designed to avoid a large value of capacitors (e.g., 2.2 μF instead of 6.8 μF), which is necessary in order to reduce the impedance at 170 kHz. An equivalent resistance of the parallel resonant circuit L3C3X is less than or equal to the impedance of the X parallel second capacitors C2 of the capacitor arrangement C2X.

Figure 3:
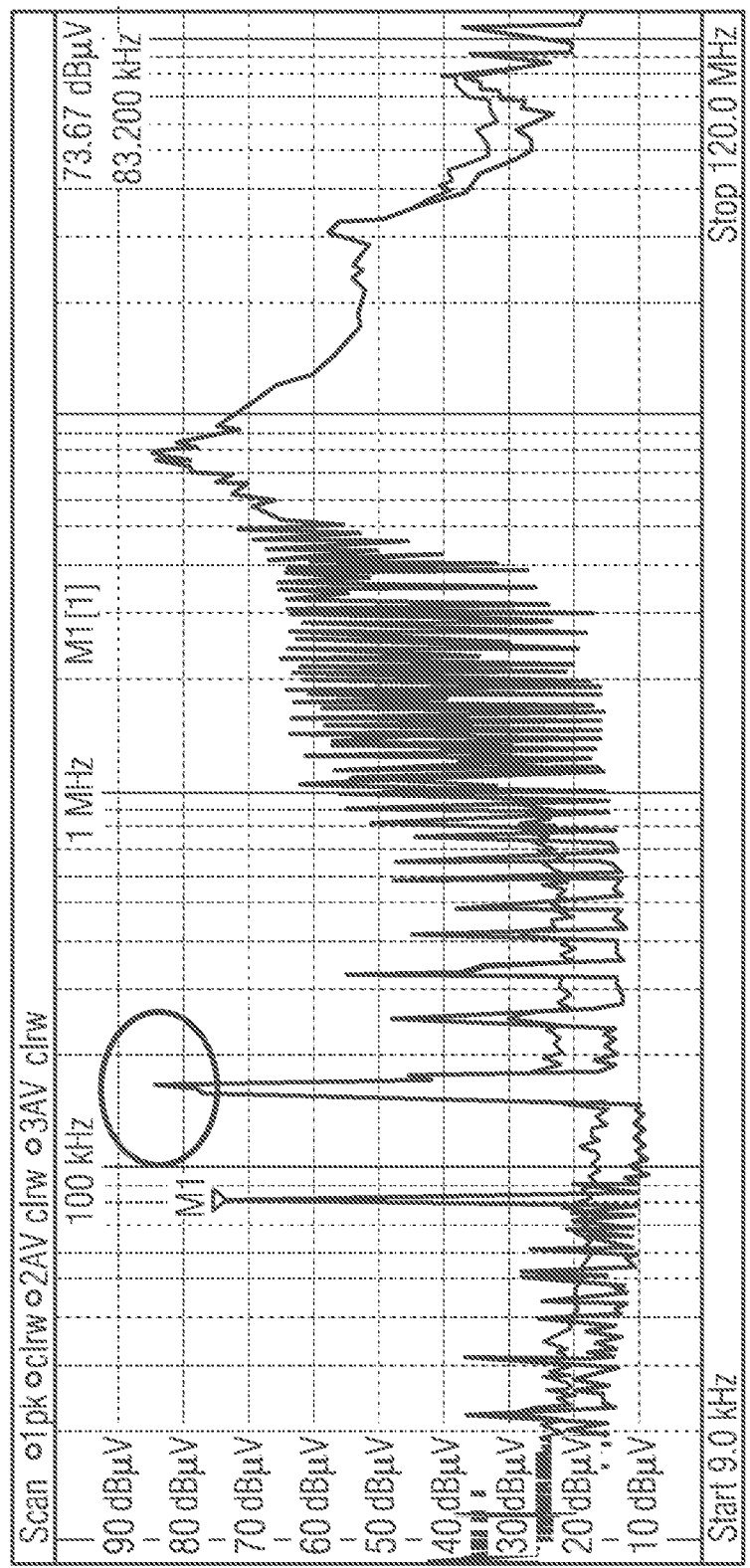
Figure 4:
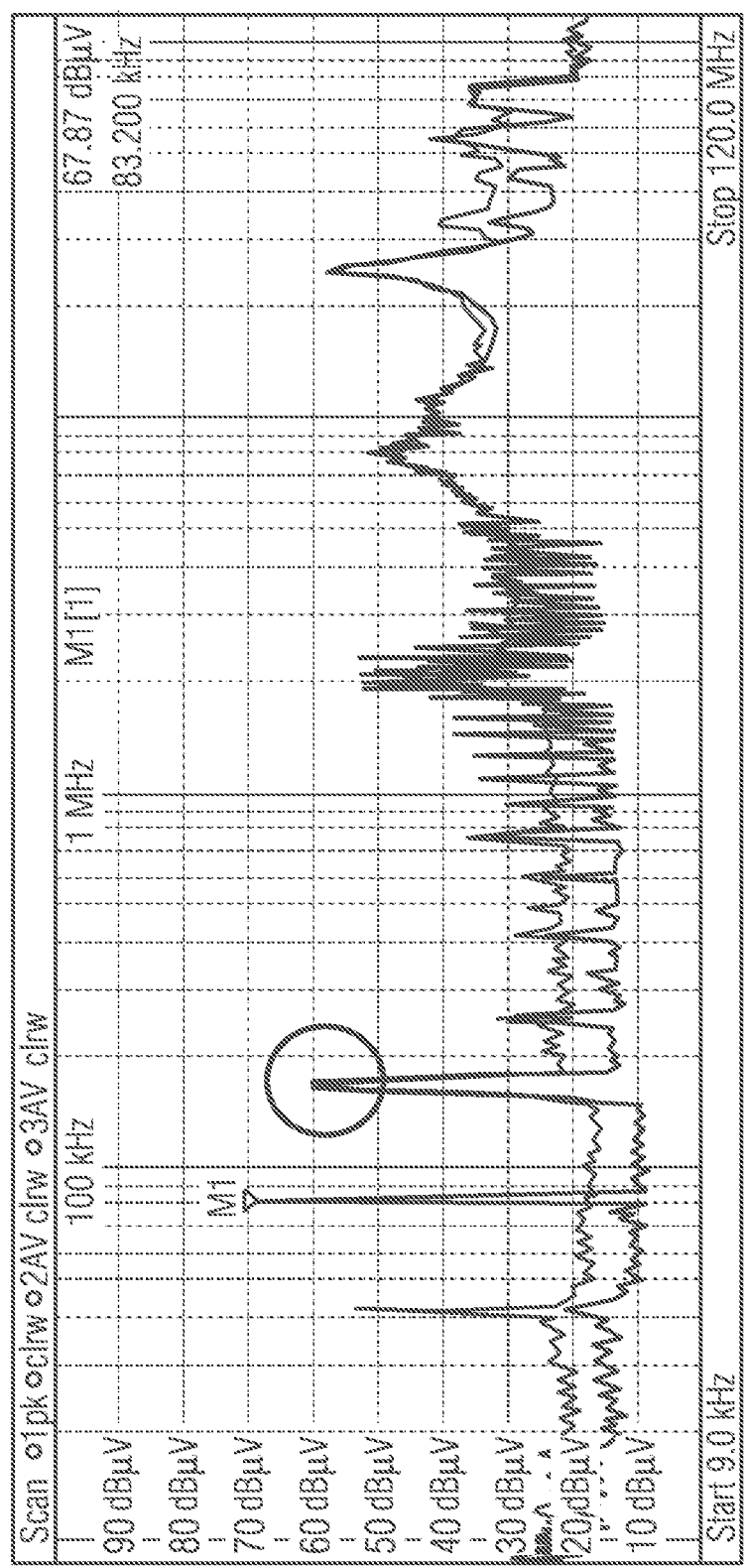

In the arrangement shown in FIG. 2, the voltage signal is first of all processed by a rectifier 21. The rectified signal subsequently reaches the filter component 20 before it is forwarded to the HV bus 22. The filter component 20 means that good attenuation of the harmonic/the 2nd harmonic in the radio LW band can be attained. In particular, it can be seen from FIG. 4 that the second harmonic (170 kHz) is attenuated by approximately 25 dB more by the filter component 20 according to the invention as by the filter component 10 based on the prior art (see FIG. 3).

The description of the subjects specified here is not limited to the individual specific embodiments. Rather, the features of the individual embodiments—insofar as it makes technical sense—can be combined with one another arbitrarily.

The invention claimed is:

1. A component for use in a wireless power transmission, the component comprising:
    a first power line and a second power line electrically connected in parallel to the first power line;
    a first and a second inductor electrically connected in series in the first power line;
    a third and a fourth inductor electrically connected in series in the second power line;
    a first capacitor electrically connected between the first power line and the second power line;
    a second capacitor electrically connected between the first power line and the second power line such that the first capacitor, the second inductor and the second capacitor establish a first CLC-Pi-circuit and such that the first capacitor, the fourth inductor and the second capacitor establish a second CLC-Pi-circuit,
    wherein the first, second, third and fourth inductors and the first and second capacitors establish at least one LC filter stage; and
    a resonant circuit connected downstream of the LC filter stage, the resonant circuit having a further inductance and at least one further capacitor connected in series with the further inductance,
    wherein the LC filter stage has a first filter stage and a second filter stage,
    wherein the first filter stage has at least one first capacitor, the at least one first capacitor comprising the first capacitor, wherein the second filter stage has at least one second capacitor, the at least one second capacitor comprising the second capacitor, wherein an equivalent resistance of the resonant circuit is less than or equal to an impedance of the at least one second capacitor connected in parallel, and wherein the component is a filter component.

2. The filter component according to claim 1, wherein a value of the at least one further capacitor of the resonant circuit is equal to a value of the at least one second capacitor.

3. The filter component according to claim 1, wherein a fundamental frequency of the wireless power transmission is between 81 kHz and 90 kHz, and wherein the resonant circuit is configured to attenuate a second harmonic.

4. The filter component according to claim 1, wherein the resonant circuit has a quality factor Q, and wherein $Q \leq 100$.

5. The filter component according to claim 1, wherein the further inductance is designed such that a resonant frequency is 170 kHz.

6. A method for using the filter component according to claim 1, the method comprising:

operating the resonant circuit of the filter component at a frequency of 170 kHz with a quality factor of $Q \leq 100$.

7. The filter component according to claim 1, wherein the resonant circuit is configured to attenuate harmonics in a longwave band.

8. A component for use in a wireless power transmission, the component comprising:

a first power line and a second power line electrically connected in parallel to the first power line;

a first and a second inductor electrically connected in series in the first power line;

a third and a fourth inductor electrically connected in series in the second power line;

a first capacitor electrically connected between the first power line and the second power line;

a second capacitor electrically connected between the first power line and the second power line such that the first capacitor, the second inductor and the second capacitor establish a first CLC-Pi-circuit and such that the first capacitor, the fourth inductor and the second capacitor establish a second CLC-Pi-circuit, wherein the first, second, third and fourth inductors and the first and second capacitors establish at least one LC filter stage;

a resonant circuit connected downstream of the LC filter stage, the resonant circuit having a further inductance and at least one further capacitor connected in series with the further inductance, wherein the LC filter stage has a first filter stage and a second filter stage, wherein the first filter stage has at least one first capacitor, the at least one first capacitor comprising the first capacitor, wherein the second filter stage has at least one second capacitor, the at least one second capacitor comprising the second capacitor, and wherein an equivalent resistance of the resonant circuit is less than or equal to an impedance of the at least one second capacitor connected in parallel; and a third capacitor electrically connecting an electrode of the first capacitor to ground and a fourth capacitor electrically connecting a respective other electrode of the first capacitor to ground, wherein the component is a filter component.

9. The filter component according to claim 8, wherein a value of the at least one further capacitor of the resonant circuit is equal to a value of the at least one second capacitor.

10. The filter component according to claim 8, wherein the filter component is configured to operate at a fundamental frequency of the wireless power transmission between 81 kHz and 90 kHz.

11. The filter component according to claim 10, wherein the resonant circuit is configured to attenuate a second harmonic.

12. The filter component according to claim 8, wherein the resonant circuit has a quality factor Q, and wherein $Q \leq 100$.

* * * * *